Feb. 1, 1955   B. A. L. STEINBORN   2,701,050
CONVEYER BELT ADAPTED TO MOVE ALONG A CURVED PATH
Filed Aug. 21, 1951   3 Sheets-Sheet 1
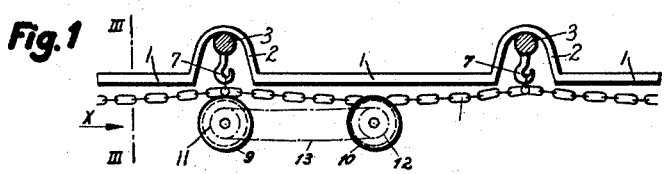
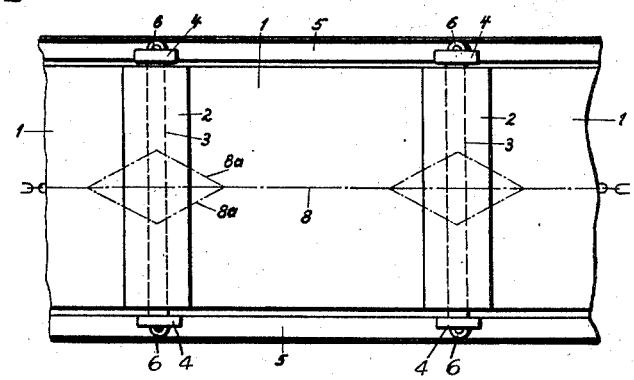
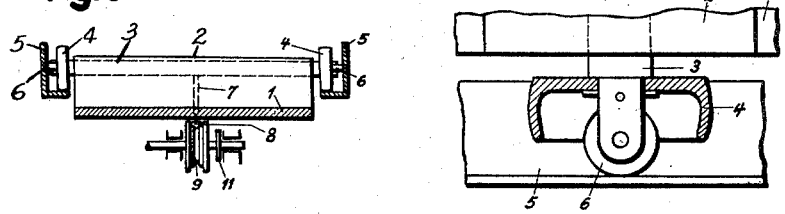
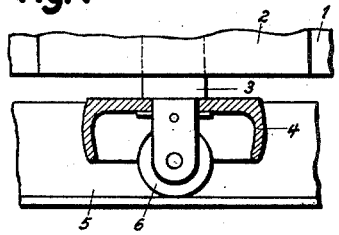
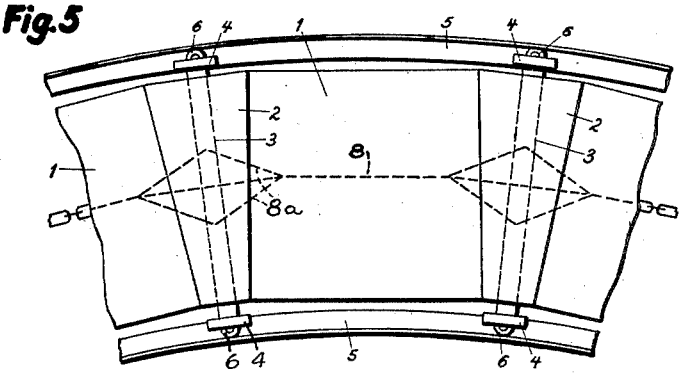
Inventor:
Bernhard A.L. Steinborn
by [signature]
Patent Agent

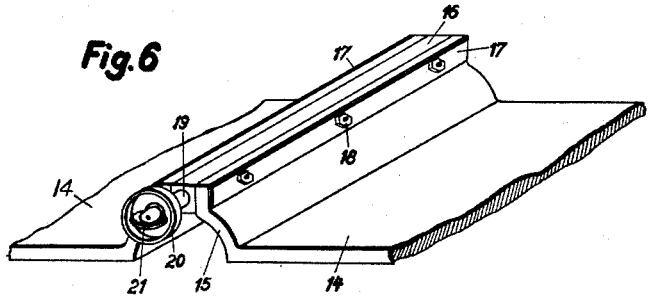
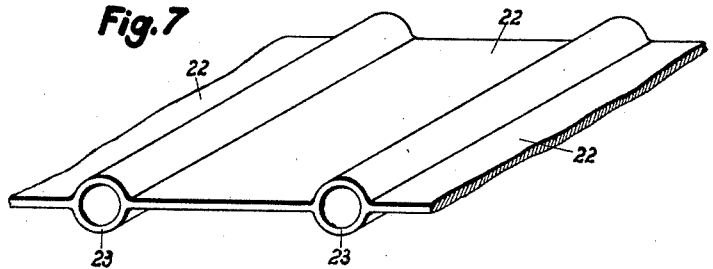
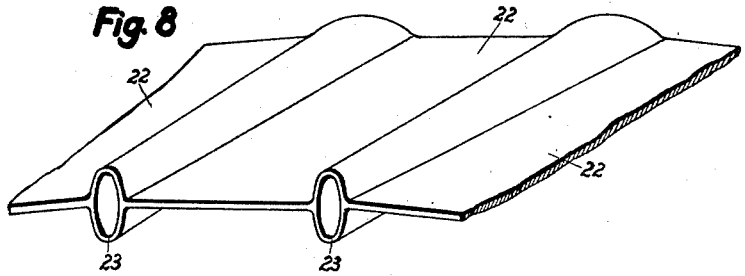
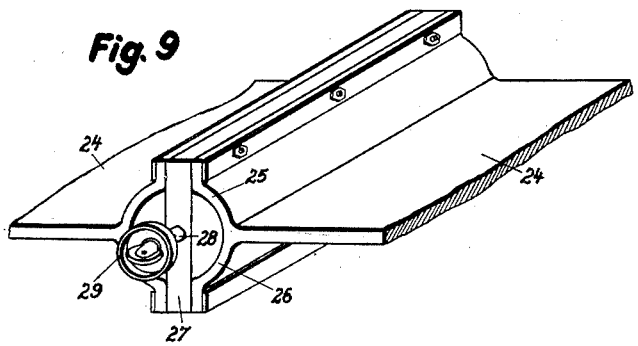

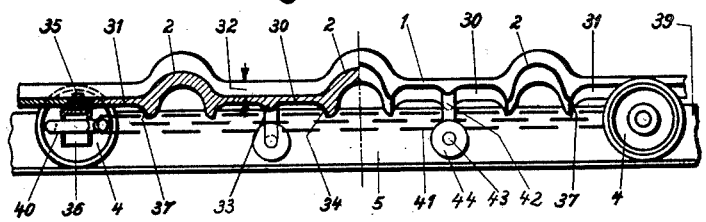
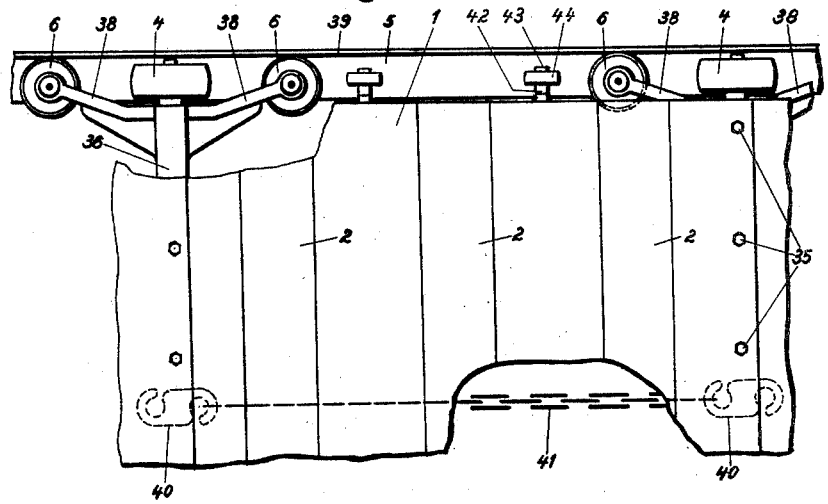

United States Patent Office 2,701,050
Patented Feb. 1, 1955

2,701,050

CONVEYER BELT ADAPTED TO MOVE ALONG A CURVED PATH

Bernhard A. L. Steinborn, Wuppertal-Sonnborn, Germany, assignor to Friedrich K. H. Stubbe, Vlotho a. d. Weser, Germany Application August 21, 1951, Serial No. 242,877

Claims priority, application Germany August 30, 1950

17 Claims. (Cl. 198—182)

The present invention relates to conveyor belts and, more particularly, to conveyor belts adapted to move along a curved path. In many organizations, there exists the need for a conveyor belt of this type, which is simple, reliable and effective. This need is particularly great in mining operations where such conveyors are used for quickly removing broken up or piled up coal from the rooms to the main gallery or main entry from where further transport is effected by trains.

With the heretofore known conveyor belts adapted to move along curved paths, small conveyor boxes or troughs of sheet metal on rollers are used. These are pulled by chains and spread in the curves. The space between two adjacent boxes is bridged by rubber plates. Conveyor belts of this type are heavy, expensive and, due to their complicated structure, are not sufficiently reliable, especially for rough handling or operation, so that frequent stoppages, and thereby losses in the hauling are unavoidable.

It is, therefore, an object of this invention to provide a conveyor belt adapted to move along curved paths, which is of a simple and reliable construction and will overcome the above mentioned drawbacks.

It is another object of this invention to provide a conveyor belt adapted to move along a curved path, which has a continuous surface free from crevices into which the material to be conveyed may enter and thus jeopardize the proper functioning of the conveyor.

It is also an object of this invention to provide a conveyor belt adapted to move along a curved path, which will be provided with means adapted automatically to take care of compressions and expansions while the belt is passing through a curve, and which will prevent pourable goods from sliding backwards when the belt is moving up an incline.

A further object of this invention consists in the provision of a conveyor belt of the above mentioned type, which will be provided with means adapted in a simple manner to assure an even and smooth drive of the conveyor belt.

It is still a further object of this invention to provide a conveyor belt of the character set forth in the preceding paragraphs, which is composed of a plurality of sections, in which the elements interconnecting said sections are also adapted to carry the supporting and moving means of the belt.

These and other objects and advantages of the invention will appear more clearly from the following specification in connection with the accompanying drawings in which:

Fig. 1 partly in side view and partly in section illustrates a conveyor belt according to the present invention, the guiding means for the conveyor belt being omitted.

Fig. 2 is a top view of the arrangement shown in Fig. 1.

Fig. 3 is a section along the line III—III of Fig. 1, seen in the direction of the arrow X.

Fig. 4 shows a detail of the conveyor belt in section and on a larger scale.

Fig. 5 is a top view of the conveyor belt similar to that of Fig. 2, but showing the conveyor belt while passing through a curve.

Fig. 6 shows a perspective view of another embodiment of the conveyor belt according to this invention.

Fig. 7 is a perspective view of still another embodiment of the conveyor belt according to the present invention.

Fig. 8 illustrates the conveyor belt according to Fig. 7 while said conveyor belt is passing through a curve.

Fig. 9 is a perspective view of an embodiment of the invention similar to that shown in Fig. 6.

Fig. 10 shows a part of a trough-like conveyor belt partly in longitudinal cross-section and partly in side view.

Fig. 11 is a top view of the conveyor belt shown in Fig. 10.

General arrangement

The present invention consists primarily in that the supporting surface of the conveyor belt is provided with portions which form transverse folds and are of a material which is yieldable with regard to deforming, said supporting surface resting on axles, rods or plates provided at their ends with transporting means such as rollers.

According to a more specific embodiment of the invention, rectangularly shaped parts forming the supporting surface of the conveyor belt may be interconnected by those parts which form the transverse folds.

Preferably, the conveyor belt is made of rubber and may be provided with inserts of fabric or wire mesh. However, it may also consist of other flexible material.

It has proved advantageous to make the supporting surface of the conveyor belt not only resistant against elongation but also resistant against bending by means of corresponding inserts. In such an instance, the belt cannot sag towards the lateral edges even if a continuous lateral support is missing. The possibility of laterally moving along curved paths, and also the so-called "spiraling," i. e. the twisting about the longitudinal axis of the belt, will, in no way, be affected by such inserts due to the parts which form the transverse folds and are made of yieldable material with regard to deforming. This effect is obtained according to the present invention by reinforcing the belt with the exception of those parts which form the transverse folds. These reinforcements in form of inserts or outer layers may consist of sheet metal, rigid wire mesh, synthetic material resistant to bending, or the like.

According to the invention, the belt is furthermore given a trough-like shape by correspondingly shaping the inserts or outer layers. Such inserts or outer layers are additionally stiffened in the transverse direction by providing depressions or pressed out portions, or by portions bent outwardly or the like. Thus, a conveyor belt is obtained which combines the advantages of an ordinary rubber conveyor belt and of a robust steel conveyor belt of great carrying power.

In order to facilitate the method of making the belt and to reduce the cost thereof, the belt is built up of individual elements or links which, preferably at those portions which are provided for the journalling and the drive of the belt, are detachably connected with each other, for instance, by means of screws, while each of said elements or links is provided with parts forming transverse folds free from reinforcements or stiffening means. The distance between these parts depends on the prevailing operating conditions. The less the distances, the more will it be possible laterally to bend off the belt and thus to move the belt also through curves having a small radius of curvature, and the less may be the diameter of the direction changing drum of the belt. This is of particular importance for the conveying of coal in underground mining.

The transverse beams supporting the conveyor belt are preferably provided where two conveyor belt elements or links are connected with each other. These transverse beams are interconnected by pulley means along the central longitudinal plane of the belt. The preferably profiled transverse beams are provided at their ends with axle studs which in their turn carry supporting rollers. These axle studs are furthermore provided with guiding rollers at both sides of each supporting roller. These guiding rollers are arranged one behind the other when considering the direction of movement of the belt and serve for laterally supporting the belt. These rollers guide the transverse beams so that they will always at least approximately be perpendicular to the guiding rails or, when passing through a curve, will be at least approximately radial with regard to the center of curvature. This arrangement of the guiding rollers in pairs will thus prevent an oblique movement of the axles, which fact is of particular importance in view of the fact that the said axles are only at their central portions connected with the pulling means.

When using particularly wide belts, it is preferable additionally to support the rigid or reinforced parts of the belt at both sides thereof. This may be effected by sliding shoes or small supporting rollers which, when the belt is unilaterally loaded, will engage the guiding rails.

When using chains as pulling means, the position of the individual links of these chains and the shape of the reinforcing means of the belt immediately arranged thereabove are preferably so positioned with regard to each other that, for instance, depressions or pressed out portions or portions bent outwardly of the reinforcing means will be located above those links of the chain lying in a flat position. In this way, the support as well as the movement of the belt will be improved. The drive of the belt may be effected, for instance, by direction changing drums which take along the pulling chain, but the drive may also be effected in any other standard manner.

Structural arrangement

Referring now to the drawings in detail and Figures 1 to 5 thereof in particular, the structure shown therein represents a first embodiment of a conveyor belt according to the invention, which comprises rectangular pieces 1 made of rubber and connected with each other by arch-shaped or sector-like pieces 2 likewise made of rubber. The parts 1 and 2 may be connected mechanically as will be described later in connection with other embodiments of the invention. Placed in each arch-shaped piece open toward the bottom is an axle 3 which at both ends carries the supporting rollers 4. The supporting rollers 4 are located between L-shaped rails 5. In order to limit the lateral movement of the belt, the axles 3 are provided at their end surfaces with small rollers 6 which, when the belt is subjected to lateral stresses, will engage the vertical legs of L-beams or L-shaped rails 5. The axles located with great play in the arch-shaped pieces 2 carry at their central portion a hook 7 hanging downwardly. On this hook there is suspended a chain link of a continuous driving chain 8. Below the conveyor belt there are provided grooved driving wheels 9 and 10 which are journalled behind each other so that the sagging chain engages these grooves. The grooved wheels 9 and 10 are preferably in the longitudinal direction of the conveyor belt spaced from each other by half the distance between two adjacent axles 3. In this way, at least one of the grooved wheels will be in engagement with the chain. Connected to the axle of the grooved wheels are sprocket wheels 11 and 12 over which passes an endless chain 13. Thus a synchronous movement of the grooved wheels 9 and 10 will be assured.

When the belt passes through a curve, those ends of the pieces or sectors 2 which are located on the inner side of the curve will be compressed, while those ends located at the outer side of the curve will be pulled apart (see Fig. 5). In view of the fact that the axles 3 are connected with each other at their central portions, the sectors which, when seen from the top, are wedge-shaped, will retain their shape at this spot. From here they will be compressed toward the inside and pulled apart toward the outside. The rectangular pieces 1 of the conveyor belt remain unchanged as to their shape. In order to maintain the axles 3 in their central position relative to the sectors when the belt is passing through a curve, in other words, in order to prevent an oblique movement of the axles 3 beyond the radial position thereof, short chains 8a are connected with the chain 8 in front of the point of engagement of the chain 8 with the axles 3. These short chains 8a are connected to the adjacent axle 3 at two points located on both sides of the axle center and equally distant therefrom.

Referring now to the conveyor belt shown in Fig. 6, the rectangular rubber pieces 14 are provided at their ends, when looking in the longitudinal direction of the belt, with extensions 15 bent upwardly. Between the upper edges of the extensions which face each other and pertain to two adjacent pieces 14, there is provided a rod 16 of rectangular cross section. These extensions are provided at their outer side with a sheet metal strip 17. Bolts passing through these strips 17 and the adjacent edges of the pieces 14, as well as through rod 16, interconnect the adjacent extensions. The two end faces of the rod 16 are provided with an axle stud 19 on which supporting rollers 20 are located. The axle studs 19 protrude outwardly to such an extent that small rollers 21 rotatable about a vertical axis may be journalled in a fork of said axle studs.

The extensions 15 bent upwardly may also be provided at their edges with metal ledges which may be vulcanized thereto and are connected with each other. These metal ledges also carry the axles for the supporting rollers.

According to the embodiment shown in Figs. 7 and 8, there are provided between the rectangular rubber pieces 22 of the conveyor belt hose-like portions 23 of rubber which have a relatively large diameter and which are integral with the pieces 22. The elements for journalling and driving this conveyor belt are not shown in the drawing but in all essential parts correspond to those described above. The driving chains enter the lower portion of the hose-shaped parts at the central portion of the members 23 in order to establish a connection with the axle pertaining thereto.

Fig. 9 illustrates a structure which differs from that according to Fig. 6 merely in that the rectangular rubber pieces 24 are provided with extensions 25 bent upwardly and also with extensions 26 bent downwardly. A plate 27 is arranged between the four extensions of two adjacent pieces 24, which plate is provided at each end at the central area thereof with an axle stud 28 for supporting a supporting roller 29. The extensions and the plate are connected with each other by screw bolts.

With conveyor belts according to Figures 6 and 9, also the supporting parts located in the returning part of the belt are protected.

With the embodiment shown in Figures 10 and 11, the conveyor belt has a trough-like shape and the supporting surface of the conveyor belt consists of individual rectangular links 1 provided with parts 2 having transverse folds made of material yieldable with regard to deformation. These parts are formed by arch-shaped portions having their concave portion facing the bottom. Below those parts of the links located between the arch-shaped portions, there are provided rectangular sheet metal plates 30 and 31 which are vulcanized to said parts of the links and the cross section of which is shown in the left part of Fig. 10, while the lower face of them, according to the trough-like shape of the conveyor belt, is visible in the right part of Figure 10.

The depth of the trough formed by the belt is indicated by arrows 32 in Fig. 10.

The metal plates are likewise trough-like and arched and, in addition thereto, are provided with depressions 33 and marginal bent portions 34 forming reinforcements in the transverse direction of the belt. An individual conveyor belt link, which at 35 is connected by screws with the adjacent belt links and the cross beams 36, is according to the embodiment shown in the drawing provided with two intermediate reinforcements 30 and two end reinforcements 31 with bent portions 37.

The cross or transverse beams 36 have a U-shaped profile and are provided at their ends with supporting rollers 4. Looking in the longitudinal direction of the belt, in front and behind the supporting rollers 4, there are provided fork-shaped arms 38 which carry guiding rollers 6 rotatable about vertical axes. These guiding rollers 6 engage the vertical legs 39 of the guiding rails 5. Along the central longitudinal axis of the conveyor belt there are connected to the transverse beams 36 pulling hooks 40 in which the chains 41 connecting two adjacent transverse beams are suspended.

At both sides of the reinforcements 30 downwardly cranked arms 42 are provided, each bearing a pivot 43, supporting a roller 44. The rollers are adapted to engage the guiding rails 5 when the belt is unilaterally loaded.

It may also be mentioned that the elevations on the supporting surface of the conveyor belt are very helpful in connection with the transport of pourable goods in as much as they prevent a sliding of the goods in longitudinal direction of the belt when the conveyor belt moves at an incline.

It is, of course, understood that the invention is, by no means limited to the particular constructions shown in the drawings but also comprises any modifications within the scope of the appended claims.

What I claim is:

1. A conveyor belt adapted to move along a curved path, which comprises in combination, conveying means including a plurality of compartments having a substantially bend-resistant load-sustaining bottom curved in a direction transverse to the longitudinal direction of said conveying means and being substantially inelastic in longitudinal direction of said conveying means, said compartments being substantially evenly distributed over the entire length of said conveying means and being respectively separated from each other by yieldable channels extending in a direction transverse to the longitudinal direction of said conveying means, said channels being yieldable with regard to deforming stresses exerted thereon but being sufficiently stiff to maintain channel shape throughout the path of said belt, and means connected to said conveying means and carrying roller means for supporting said conveying means.

2. A conveyor belt adapted to move along a curved path, which comprises in combination, conveying means for supporting the goods to be conveyed, said conveying means including a plurality of substantially rectangular portions arranged one behind the other and having those end portions thereof, which are transverse to the longitudinal direction of the belt, provided with arched extensions yieldable with regard to deforming stresses exerted thereupon; said rectangular portions being interconnected by said extensions; a plurality of supporting means respectively interposed between each two adjacent extensions and detachably connected thereto; said supporting means extending transverse to the longitudinal direction of said belt; stud means supported by said supporting means; roller means supported by said stud means; and flexible pulling means connected to the central portions of said supporting means.

3. In combination in a conveyor arrangement: an endless belt having a corrugated surface throughout its entire length and comprising spaced belt sections forming the load-sustaining sections proper of said endless belt, and elastic channel-shaped connecting sections respectively interconnecting said load-sustaining sections, said channel-shaped sections having their longitudinal axes extending substantially transverse to the longitudinal extension of said belt and being sufficiently elastic to allow said channel-shaped sections to vary their width during the movement of the belt while being sufficiently stiff to maintain channel shape throughout the path of said belt; and power operable conveying means operatively connected to said belt for conveying moving power thereto.

4. In combination in a conveyor arrangement: an endless belt having a corrugated surface throughout its entire length and comprising spaced belt sections substantially inelastic in longitudinal direction of said belt and substantially bend-resistant in a direction transverse thereto, and elastic channel-shaped connecting sections respectively interconnecting said spaced belt sections, said channel-shaped sections having their longitudinal axes extending substantially transverse to the longitudinal direction of said belt and being sufficiently elastic to allow said channel-shaped sections to vary their width during the movement of the belt through a curve, while being sufficiently stiff to maintain channel shape throughout the path of said belt; and power operable conveying means operatively connected to said belt for conveying moving power thereto.

5. In combination in a conveyor arrangement: an endless belt having a corrugated surface throughout its entire length and composed of spaced belt sections substantially inelastic in longitudinal direction of said belt and forming the load-sustaining portions proper of said belt, and elastic channel sections of arch-shaped cross section interconnecting said spaced belt sections and extending substantially transverse to the longitudinal direction of said belt, said channel sections being sufficiently elastic to yield to pull and pressure but being sufficiently stiff to maintain channel shape throughout the path of said belt; and power operable conveying means operatively connected to said belt for conveying moving power thereto.

6. In combination in a conveyor arrangement: an endless belt having a corrugated surface throughout its entire length and composed of spaced belt sections substantially inelastic in longitudinal direction of said belt and forming the load-sustaining portions proper of said belt, and elastic channel sections respectively detachably interconnecting said spaced belt sections so as to form a continuous endless belt, said channel sections having their longitudinal axes extending substantially transverse to the longitudinal direction of said belt and being sufficiently elastic to allow said channel sections to vary their width during the movement of the belt while being sufficiently stiff to maintain channel shape throughout the path of said belt; and power operable conveying means operatively connected to said belt for conveying moving power thereto.

7. In combination in a conveyor arrangement: an endless belt having a corrugated surface throughout its entire length and comprising spaced belt sections forming the load-sustaining sections proper of said endless belt, and elastic channel-shaped connecting sections of rubber respectively interconnecting said load-sustaining sections, said channel-shaped sections having their longitudinal axes extending substantially transverse to the longitudinal extension of said belt and being sufficiently elastic to allow said channel-shaped sections to vary their width during the movement of the belt while being sufficiently stiff to maintain channel shape throughout the path of said belt; and power operable conveying means operatively connected to said belt for conveying moving power thereto.

8. In combination in a conveyor arrangement: an endless belt having a corrugated surface throughout its entire length and comprising spaced belt sections having metal plates connected thereto to stiffen said belt sections, said belt sections forming the load-sustaining portions proper of said belt, and elastic channel sections having their longitudinal axes transverse to the longitudinal direction of said belt and interconnecting said spaced metal plate reinforced belt sections so as to form therewith a continuous endless belt said channel sections being sufficiently stiff to maintain channel shape throughout the path of said belt but being sufficiently elastic to vary their width in response to pressure or tension exerted upon said belt; and power operable conveying means operatively connected to said belt for conveying moving power thereto.

9. A conveyor belt according to claim 8, in which all the stiffened sections are trough-shaped.

10. A conveying arrangement according to claim 3, in which said load-sustaining sections are curved transverse to the longitudinal extension of said belt so that when said load-sustaining sections are in load-carrying position their central areas are located lower than the areas adjacent the longitudinal edges of said belt, said elastic channel-shaped connecting sections being likewise curved transverse to the longitudinal extension of said belt in conformity with the curvature of said load-sustaining sections.

11. A conveyor arrangement according to claim 3, in which the channel-shaped connecting sections have a substantially circular cross section throughout their length.

12. A conveyor arrangement according to claim 3, in which the channel-shaped connecting sections have a substantially elliptic cross section throughout their length.

13. A conveyor arrangement according to claim 3, in which some of said channel-shaped connecting sections comprise two elastic arched portions respectively integral with the respective adjacent load-sustaining sections, and a supporting member extending substantially transverse to the longitudinal extension of said belt and detachably interconnecting said two elastic arched portions; guiding roller means being rotatably supported by said supporting member and being arranged for contact with guiding means for laterally guiding said belt.

14. A conveyor arrangement according to claim 3, in which some of said channel-shaped connecting sections comprise a first arched section extending upwardly and downwardly from one of the respective two adjacent load-sustaining sections, a second arched section extending upwardly and downwardly from the other one of the respective two adjacent load-sustaining sections, and a supporting member extending transverse to the longitudinal extension of said belt and detachably interconnecting said first and second arched sections; guiding roller means being rotatably supported by said supporting member and being arranged for contact with guiding means for laterally guiding said belt.

15. A conveyor arrangement according to claim 3, which includes a plurality of supporting members extending transverse to the longitudinal direction of said belt and connected to said belt, said supporting members carrying rollers and being arranged in substantially uniformly spaced relationship over the entire length of said belt, and in which the power operable conveying means includes a main chain connected to said supporting members at points located in the central longitudinal plane passing through said belt, said power operable conveying means also comprising auxiliary chains arranged in pairs with one end of each pair connected to the main chain at a point located in front of the point of engagement of the main chain with the respective supporting member, the other ends of each pair of auxiliary chains being connected with the adjacent supporting member at points located on both sides of the central portion of the respective supporting member and equally distant from said central portion.

16. A conveyor belt adapted to move along a curved path, which comprises in combination: a plurality of individual belt elements arranged one behind the other, each of said elements having at least one substantially rigid load-sustaining section and an elastic bulged-out portion at each end of each element, said elastic portions being integral with the load-sustaining section of the belt element pertaining thereto, said elastic bulged-out portions extending transverse to the longitudinal direction of said belt and being yieldable with regard to deforming stresses exerted thereupon while being sufficiently stiff to remain in bulged-out form throughout the path of said belt, means interconnecting adjacent bulged-out portions, and roller means mounted on said last mentioned means for supporting the latter.

17. As a new article of manufacture, a conveyor belt link which includes at least two sections substantially inelastic in longitudinal direction of said link and interconnected by an elastic bulged-out channel-shaped section extending transverse to the longitudinal central axis of said belt link, said channel-shaped section being yieldable to vary the width thereof but being sufficiently stiff to maintain channel shape when subjected to the normal pulling and pressing forces occurring with a belt for which said link is designed.

References Cited in the file of this patent

UNITED STATES PATENTS

| | | |
|---|---|---|
| 706,294 | Beck | Aug. 5, 1902 |
| 809,827 | Lucas | Jan. 9, 1906 |
| 851,701 | Spear | Apr. 30, 1907 |
| 1,422,398 | Wentz | July 11, 1922 |
| 1,933,554 | Holmes | Nov. 7, 1933 |
| 2,256,168 | Paterson | Sept. 16, 1944 |